United States Patent [19]

Guest

[11] Patent Number: 5,615,895
[45] Date of Patent: Apr. 1, 1997

[54] SEAL ARRANGEMENTS

[76] Inventor: John D. Guest, "IONA", Cannon Hill Way, Bray, Maidenhead, Berkshire, SL6 2EX, England

[21] Appl. No.: 351,666

[22] Filed: Dec. 8, 1994

[30] Foreign Application Priority Data

Dec. 13, 1993 [GB] United Kingdom .................. 9325432

[51] Int. Cl.$^6$ .............................. F16J 15/32; F16L 21/06
[52] U.S. Cl. ...................... 277/208; 277/207 A; 285/323
[58] Field of Search ............................. 277/207 A, 208, 277/207 R, 152; 285/323, 351, 110, 374

[56] References Cited

U.S. PATENT DOCUMENTS

| | | | |
|---|---|---|---|
| 2,451,070 | 10/1948 | Chamberlain | 277/207 A |
| 3,913,928 | 10/1975 | Yamaguchi | 277/207 A |
| 3,998,478 | 12/1976 | Zopfi | 277/207 A |
| 4,645,246 | 2/1987 | Guest | 285/323 |
| 4,657,286 | 4/1987 | Guest | 285/323 |
| 4,902,043 | 2/1990 | Zillig et al. | 285/4 |
| 5,078,429 | 1/1992 | Braut et al. | 285/4 |
| 5,205,594 | 4/1993 | Stoll et al. | 285/323 |

FOREIGN PATENT DOCUMENTS

| | | |
|---|---|---|
| 87310926 | 6/1988 | European Pat. Off. . |
| 0320443 | 6/1989 | European Pat. Off. . |
| 0351466 | 1/1990 | European Pat. Off. . |
| 0416831 | 3/1991 | European Pat. Off. . |
| 0518679 | 12/1992 | European Pat. Off. . |
| 0518678 | 12/1992 | European Pat. Off. . |
| 0555981 | 8/1993 | European Pat. Off. . |
| 0554111 | 8/1993 | European Pat. Off. . |
| 1350593 | 4/1974 | United Kingdom . |
| 2150243 | 6/1985 | United Kingdom . |
| 2165604 | 4/1986 | United Kingdom . |

*Primary Examiner*—William A. Cuchlinski, Jr.
*Assistant Examiner*—John L. Beres
*Attorney, Agent, or Firm*—Baker & Daniels

[57] ABSTRACT

A seal arrangement in a resilient molded plastics body having a bore to receive a cylindrical component. The seal is formed by a plurality of resiliently flexible annular lips molded integrally with the bore at spaced locations along the bore and extending inwardly of the bore to seal with the surface of a cylindrical component (e.g. a tube) inserted in the bore. The lips are angled to extend both inwardly and along the bore in one direction to receive said cylindrical component and preferably three or more sealing lips are provided.

3 Claims, 6 Drawing Sheets

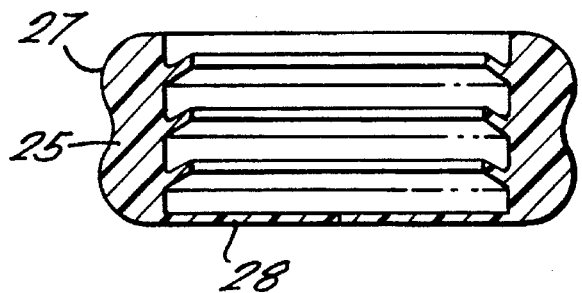
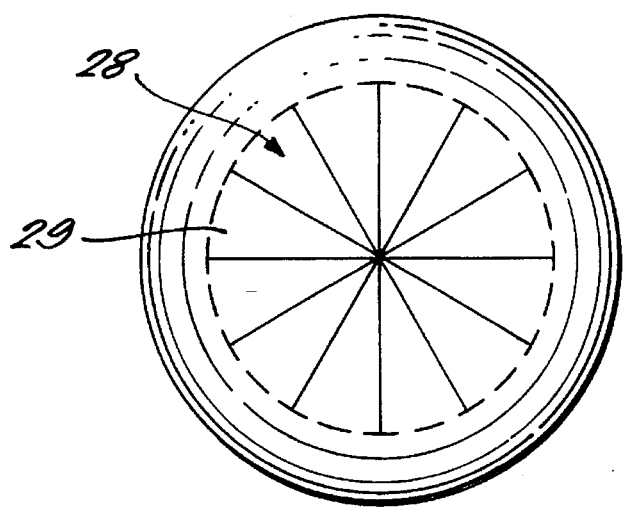
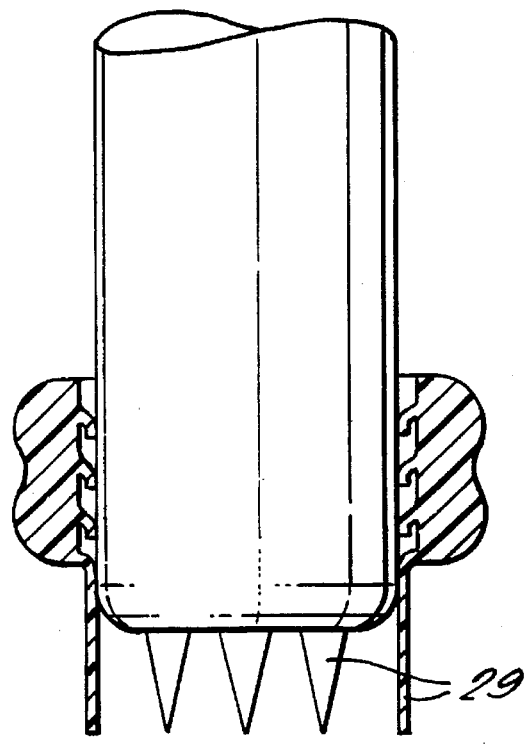

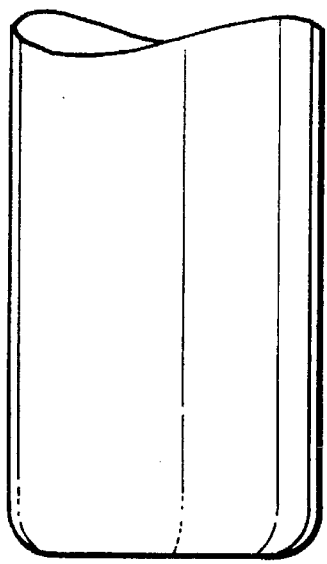
FIG. 9.
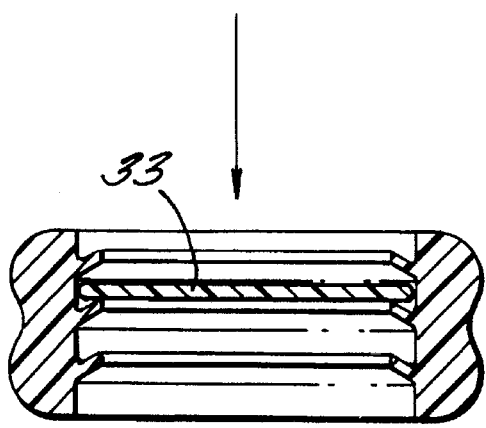
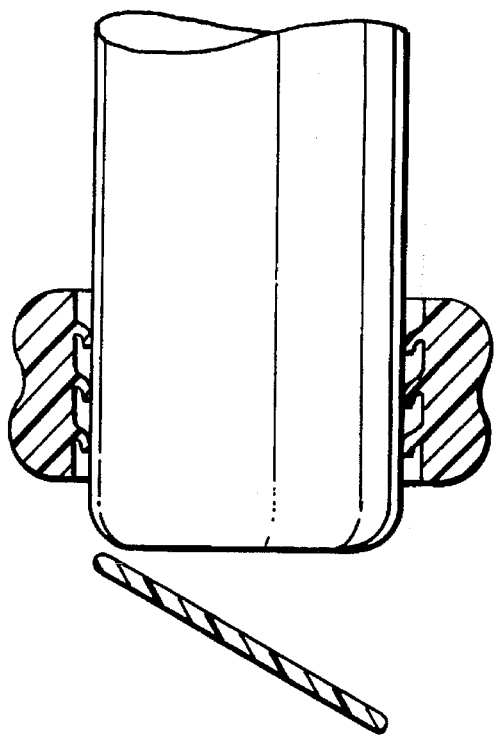
FIG. 10.

SEAL ARRANGEMENTS

BACKGROUND OF THE INVENTION

1. Field of the Invention

This invention relates to seal arrangements.

2. Description of the Prior Art

UK Patent Nos 1520742, 1573757 and 2132295 disclose tube couplings in which a coupling body has throughway open at one end to receive a tube with an internal tapered cam surface converging towards the open end of the body in which a collet is disposed with resilient arms which engage the taper cam surface to be forced inwardly thereby to grip and hold the tube in the body. The throughway in the body is formed with a step facing towards the open end and an O-ring seal is located in the throughway adjacent the step to form a seal between the outer surface of the tube and the inner surface of the coupling body to prevent loss of fluid therefrom.

UK Patent Application No 2172356 discloses a further form of tube coupling body generally in accordance with the above arrangement and provided with an inner liner extending lengthwise of the body with integral annular seals for sealing with a tube extending into the body.

European Patent Publication No 0518679 discloses a further form of tube coupling body in which the body is molded in an elastomeric material and a throughway in the body has integral V-section sealing rings molded around the inner surface of the throughway for sealing engagement with a tube inserted into the coupling body.

SUMMARY OF THE INVENTION

This invention provides a seal arrangement comprising a resilient molded plastics body having a bore to receive a cylindrical component and a plurality of resiliently flexible annular lips molded integrally with the bore at spaced locations along the bore and extending inwardly of the bore to seal with the surface of a cylindrical component (e.g. a tube) inserted in the bore.

Preferably the lips are angled to extend both inwardly and along the bore in one direction to receive said cylindrical component. It is further preferred that two or more lips are provided as appropriate according to the length of bore available.

In one application of the invention the molded plastics body may be a tube coupling body, the bore forming part of a throughway in the body to receive a tube to be coupled therein, the throughway having an open end in which a tube locking device is located to receive and lock a tube in the body and said bore and plurality of encircling lips being formed integrally in the body adjacent said open end to receive and seal with the tube located in the coupling body.

In another application the body is adapted to fit in a further component.

In the latter case the body may have encircling sealing means for sealing with the further component into which it is to be fitted.

In a further arrangement according to the invention the body may be formed with an integral openable diaphragm for closing the bore in the body.

By way of example the diaphragm may be formed with a multiplicity of radially extending slits to create a number of fingers formed integrally with the bore of the body which can be deflected to open the bore in the body.

In a still further arrangement the body may have a flap valve for closing the bore in the body.

More specifically the flap valve may have a rupturable connection to the body on the other side thereof to open when the cylindrical component is inserted in the body.

In yet a further arrangement a separate valve disc may be mounted in the bore in the body trapped between adjacent sealing lips to be released when subjected to an excess load or pressure.

BRIEF DESCRIPTION OF THE DRAWINGS

FIG. 4 is a similar view to FIG. 3 incorporating an openable diaphragm;

FIG. 5 is an end view of the arrangement shown in FIG. 4;

FIG. 6 is a similar view to FIG. 4 with a tube inserted through the body to open the diaphragm;

FIG. 9 is a similar view to FIG. 3 showing a closure disc in place in the bore of the body;

FIG. 10 shows the disc displaced by insertion of a tube in the body;

DESCRIPTION OF THE PREFERRED EMBODIMENT

Figure 1:
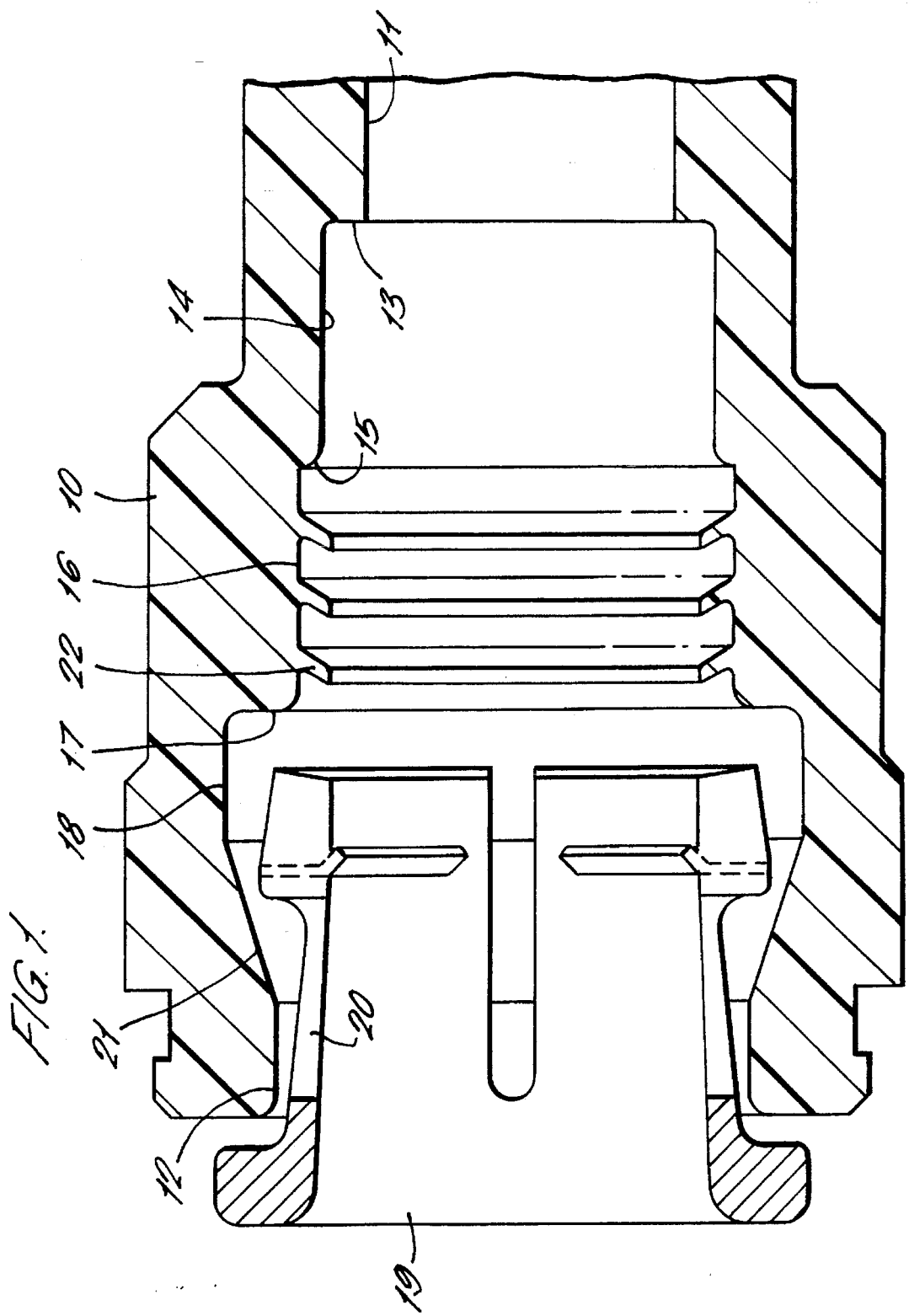
FIG. 1 is a cross-sectional view through a tube coupling body incorporating a seal arrangement in accordance with the invention.

Referring firstly to FIG. 1 of the drawings, there is shown a tube coupling of the type generally described and illustrated in U.K. Patent Nos. 1,520,742, 1,573,757 and 2,132,295. The coupling comprises a coupling body which is molded in any suitable resilient/flexible plastics material including nylon, polyethylene, polypropylene or an elastomeric polyester material such as that sold under the Trade name "Hytrel".

The coupling body has a throughway 11 which leads through a number of enlarged sections to a reduced diameter opening 12 at one end of the body.

The throughway 11 is increased in diameter by a step 13 to form a first enlarged diameter section 14 to receive an end part of a tube (not shown) to be located in the coupling body. Section 14 gives way at a rounded step 15 to an enlarged diameter sealing section 16 which in turn gives way at a step 17 to an enlarged section 18 in which a collet 19 is engaged for locking a tube in the tube coupling. The collet has resilient fingers 20 engageable with a tapered cam surface 21 reducing in diameter towards the open end 12 of the coupling body to cause the heads of the collet to grip and engage a tube passing through the collet to lock the tube in the coupling body.

The enlarged sealing section 16 of the throughway is formed with three (or more) spaced inclined integral annular sealing lips or fins 22 which are angled towards the open end of the body. The lips seal with the outer surface of the tube when the tube is pressed into the coupling body. The coupling body is formed by injection molding and the lips are formed by deep grooves in a core pin in the mold. Because they are angled, they can be bumped or stretched off the core. Their shape and design allows them to seal on the tube in both directions. As a tube is inserted into the coupling body, the lips bend in with the tube giving a tight and effective seal.

Figure 2:
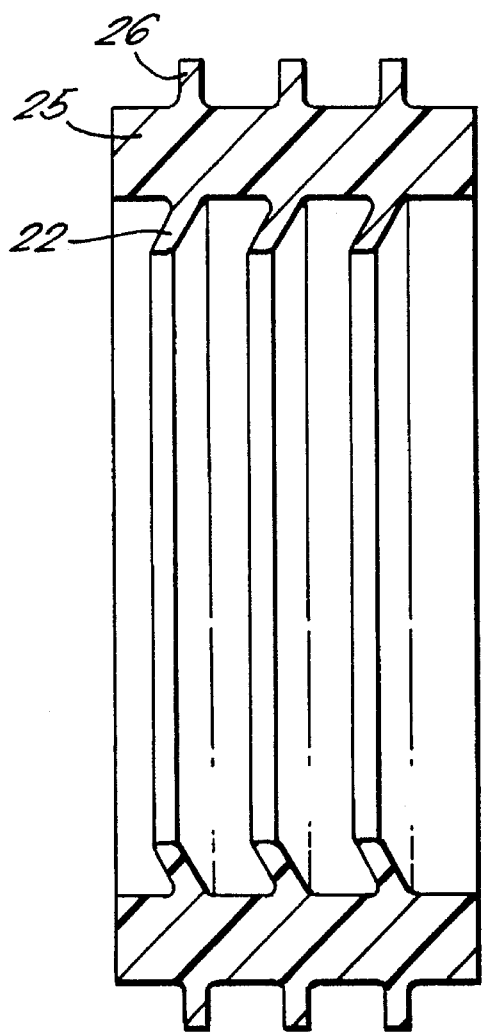
FIG. 2 is a cross-sectional view through a separate body having a throughway and seal arrangement in accordance with the invention.

FIG. 2 shows the application of the seal arrangement to a separate sleeve 25 which is adapted to be inserted in a further component. The sleeve 25 has integral external sealing rings or lips 26 extending radially of the outer surface of the sleeve to seal with the bore in which the sleeve is to be located. The sleeve may also be provided with end seal to engage with the body in which it is mounted.

Figure 3:
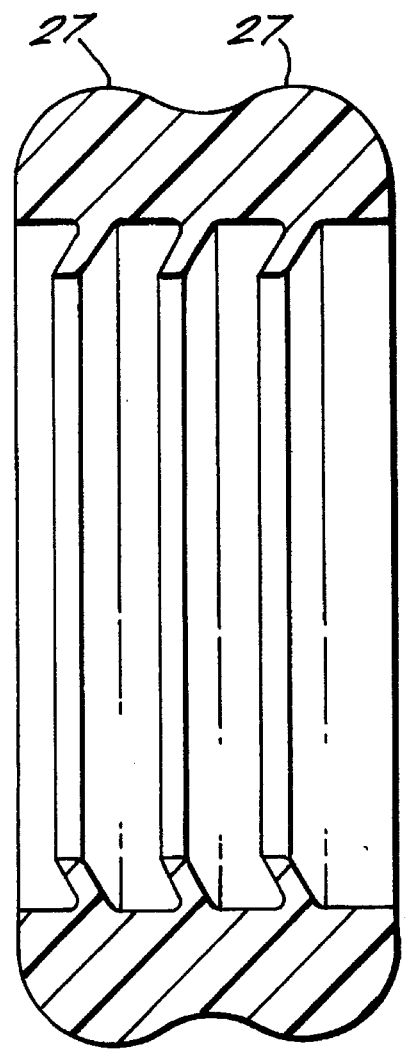
FIG. 3 is a similar view to FIG. 2 showing an alternative form of body.

FIG. 3 shows a variant of the arrangement shown in FIG. 2 in which the radial lips 26 are replaced by two rounded contours 27 on the external periphery of the sleeve.

FIGS. 4 to 6 show a similar arrangement to that of FIG. 3 with the addition of an openable diaphragm 28 at one end of the sleeve. The diaphragm is formed integrally with the coupling body and has a plurality of closely spaced radial slots to create a number of separate diaphragm fingers 29 which can open in response to a pressure differential or can be opened by insertion of a tube through the sleeve as shown in FIG. 6.

Figure 7:
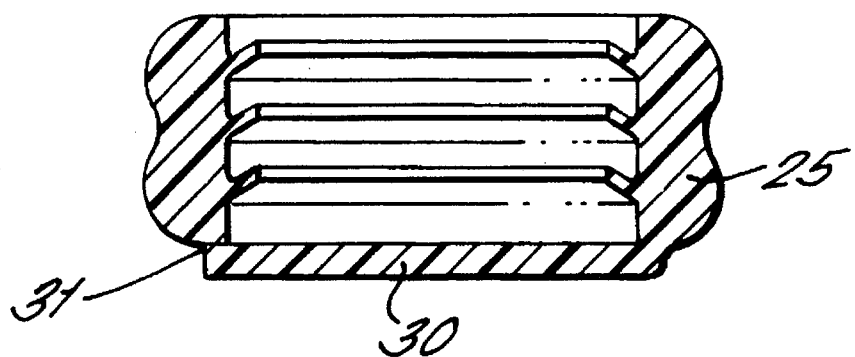
FIG. 7 is a similar view to FIG. 3 with the addition of a flap valve shown in the closed position.
Figure 8:
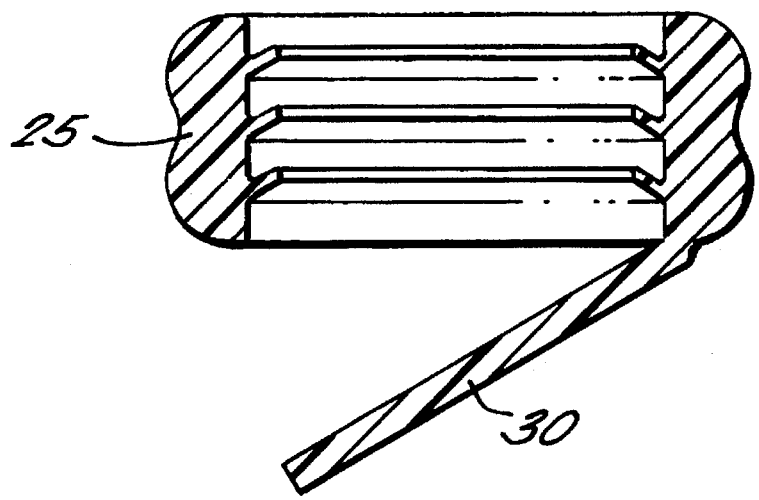
FIG. 8 is a similar view to FIG. 7 with the flap valve shown open.

FIGS. 7 and 8 show a further variant of the sleeve design of FIG. 3 provided with an integral flap valve 30 hinged at its periphery to one side of the sleeve 25 and with a frangible or weak connection 31 on the opposite side. Thus insertion of a tube through the sleeve bursts open the flap valve as shown in FIG. 8.

FIGS. 9 and 10 show a similar arrangement except that the flap valve is formed by a separate disc 33 lodged initially between adjacent sealing lips and which can be displaced by insertion of a tube through the sleeve.

Figure 11:
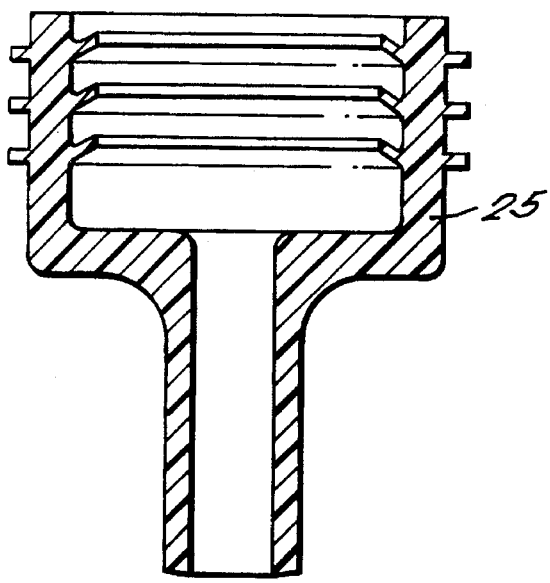
FIG. 11 shows a modification of the body of FIG. 2 applied to a non-return valve.
Figure 13:
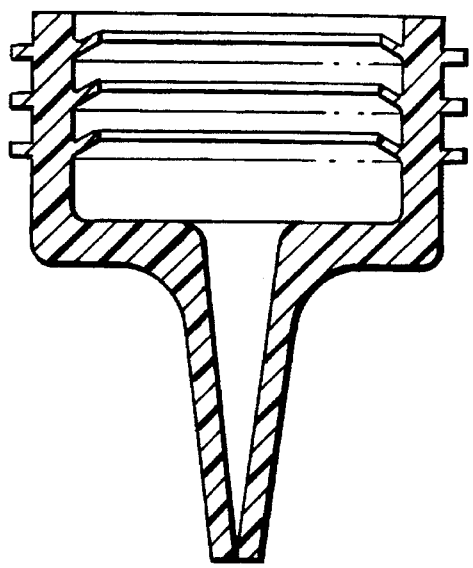
FIG. 13 is a similar view to FIG. 11 showing an alternative valve design.
Figure 12:
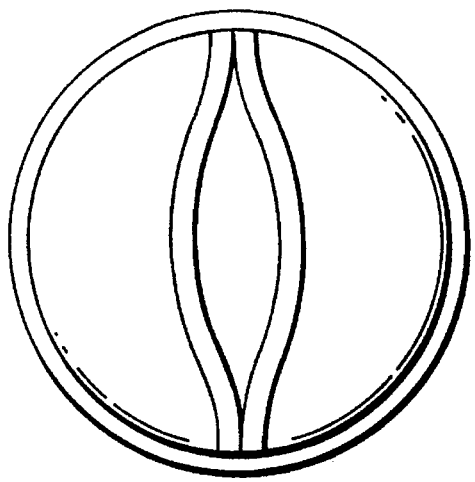
FIG. 12 is an end view of the non-return valve of FIG. 11.
Figure 14:
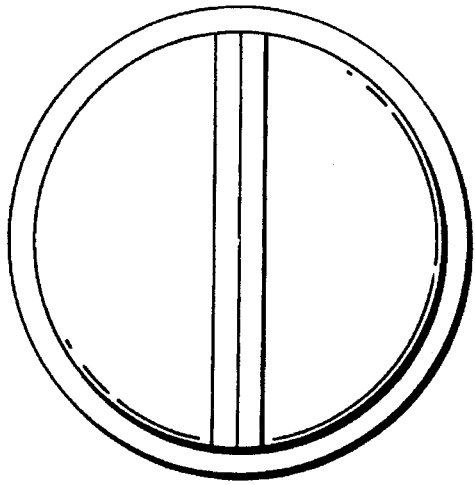
FIG. 14 is an end view of the arrangement of the valve of FIG. 13.

It will be appreciated that the seal arrangements described above can be incorporated in a variety of other devices. By way of example FIGS. 11 and 12 show application of the sleeve 25 of FIG. 2 to common types of non-return valve arrangements.

What is claimed is:

1. A seal arrangement comprising a resilient molded plastic body having a stepped bore open at one end to receive a cylindrical component, a smaller diameter portion remote from said open end in which the cylindrical component is a close fit, a larger diameter portion near said open end, and a plurality of resiliently flexible annular lips molded integrally with said larger diameter portion of said bore at spaced locations along said larger diameter portion of said bore and extending inwardly of said bore beyond said smaller diameter portion to seal with the cylindrical component inserted in said bore through said open end, said lips being angled inwardly and along said bore toward said open end to receive the cylindrical component, said lips being adapted to flex away from said open end of said bore upon insertion of the cylindrical component to provide a fluid pressure resistant seal with the component.

2. A seal arrangement as claimed in claim 1, wherein three or more lips are provided.

3. A seal arrangement as claimed in claim 1, wherein said molded plastic body is a tube coupling body, the bore forming part of a throughway in the body to receive a tube to be coupled therein, the throughway having an open end in which a tube locking device is located to receive and lock a tube in the body and said bore and plurality of encircling lips being formed integrally in the body adjacent said open end to receive and seal with the tube located in the coupling body.

\* \* \* \* \*